Patented Aug. 24, 1937

2,091,235

UNITED STATES PATENT OFFICE 2,091,235

1,3 - DIHALOGEN - 2 - MONOMETHYLAMINO-ANTHRAQUINONES AND PROCESS FOR PREPARING SAME

Joseph Deinet, Milwaukee, Wis., assignor to E. I. du Pont de Nemours & Company, Wilmington, Del., a corporation of Delaware No Drawing. Application August 22, 1935, Serial No. 37,329

9 Claims. (Cl. 260—60)

This invention relates to the preparation of new dyestuff intermediates of the anthraquinone series and more particularly to the production of 1,3-dihalogen - 2 - monomethylamino-anthraquinones as new compounds and to the process for preparing the same.

I have found that 1,3-dihalogen-2-amino-anthraquinone cannot be mono-methylated by the methods usually employed for monomethylating alpha-amino-anthraquinones. When 1,3-dihalogen-2-amino-anthraquinones are reacted with methyl alcohol and concentrated sulfuric acid (as disclosed in German Patent 288,825), products are obtained which analyses show to be dimethylamino-1,3-dihalogen-anthraquinones, and which cannot be converted to N-dimethyl-indanthrones.

It is an object of my invention to prepare 1,3-dihalogen - 2 -monomethylamino-anthraquinones as new compounds which may be used as intermediates in the production of indanthrone colors.

It is a further object of the invention to provide a process for mono-methylating 1,3-dihalogen-2-amino-anthraquinones whereby 1,3-dihalogen-2-monomethylamino-anthraquinone may be produced in good yields and in a relatively pure form.

I have found that 1,3-dibromo-2-amino-anthraquinone, 1,3-dichloro - 2 - amino-anthraquinone and 1-bromo-2-amino-3-chloro - anthraquinone can be reacted with formaldehyde in concentrated sulfuric acid to give products which when subjected to the usual indanthrone condensation give cold dyeing colors which dye cotton in blue shades from red-brown vats. Analyses and simple reactions show the resulting products to be monomethylamino-dihalogen-anthraquinones. The reaction may be carried out using formaldehyde in water solution with sufficient oleum to give an ultimate acid concentration of above 90% sulfuric acid, preferably about 97–98%. The reaction is carried out at ordinary room temperatures, temperatures from 10–50° C. having been found to give good results.

The following examples are given to more fully illustrate my invention. The parts used are by weight.

Example 1

100 parts of 2-amino-1,3-dibromo-anthraquinone are dissolved in 1000 parts of oleum (14% free SO₃) at 10–15° C. under agitation. When completely dissolved, 100 parts of formaldehyde solution (37%) are slowly added over a period of from 3–4 hours, and the temperature is raised to about 25° C., and the mass stirred at this temperature for about 24 hours. The mass is then poured into 7500 parts of water, heated to 95–100° C. and held for ½–1 hour. The product is filtered, washed acid free and dried. It is a yellow powder which dissolves in sulfuric acid with a yellow color. It can be further purified by dissolving in cold concentrated sulfuric acid and precipitating it therefrom by bringing the acid concentration to about 70–72%. The resulting product has a melting point of 247–248° C. Analysis and simple chemical tests show the product to be 1,3-dibromo-2-monomethylamino-anthraquinone.

Example 2

100 parts of 1-bromo-2-amino-3-chloro-anthraquinone are dissolved in 1000 parts of 14% oleum at 10–15° C. 100 parts of formaldehyde solution (37%) are then slowly added over a period of 3–4 hours while the mass is held at 10–15° C. The temperature is then raised to 25° C. and the mass stirred for about 24 hours. It is then poured into 7500 parts of water, heated at 95–100° C. and held for ½–1 hour. It is then filtered, and the filter cake washed acid free and dried. It may be purified from sulfuric acid in accordance with the procedure outlined in Example 1. The product is a yellow powder which gives a yellow color in sulfuric acid, and on being subjected to the usual indanthrone condensation is converted to 3,3'-dichloro-N-dimethyl-indanthrone.

Example 3

100 parts of 2-amino-1,3-dichloro-anthraquinone are dissolved in 1000 parts of 14% oleum at 10–15° C. 100 parts of formaldehyde solution (37%) are then slowly added over a period of 3–4 hours. The temperature is raised to 25° C. and the mass stirred for about 24 hours. It is then poured into 7500 parts of water, heated to 95° C. and held for ½–1 hour. The mass is then filtered, washed acid free and dried. The product on recrystallization from sulfuric acid is a yellow powder which dissolves in concentrated sulfuric acid with a yellow color. On being subjected to the usual indanthrone condensation it is converted in good yields to 3,3'-dichloro-N-dimethyl-indanthrone.

I have found that while the reaction is usually completed in about 24 hours at room temperatures, it may be carried out for a longer period of time, particularly when the lower temperatures are employed. In all cases, 48 to 60 hours gave complete conversion.

I claim:
1. 1,3-dihalogen-2-monomethylamino-anthraquinone.
2. 1,3-dibromo-2-monomethylamino-anthraquinone.
3. 1,3-dichloro-2-monomethylamino-anthraquinone.
4. 1-bromo-2-monomethylamino-3-chloro-anthraquinone.
5. The process which comprises reacting a 1,3-dihalogen-2-amino-anthraquinone with formaldehyde in concentrated sulfuric acid.
6. The process for preparing 1,3-dibromo-2-mono-methylamino-anthraquinone which comprises reacting 1,3-dibromo-2-amino-anthraquinone with formaldehyde in concentrated sulfuric acid.
7. The process for preparing 1,3-dichloro-2-mono-methylamino-anthraquinone which comprises reacting 1,3-dichloro-2-amino-anthraquinone with formaldehyde in concentrated sulfuric acid.
8. The process for preparing 1-bromo-2-monomethyl-amino-3-chloro-anthraquinone which comprises reacting 1-bromo-2-amino-3-chloro-anthraquinone with formaldehyde in concentrated sulfuric acid.
9. The process for producing 1,3-dihalogen-2-mono-methylamino-anthraquinone which comprises reacting a 1,3-dihalogen-2-amino-anthraquinone with formaldehyde at temperatures of from 10–50° C. in sulfuric acid of about 98% strength.

JOSEPH DEINET.